(12) United States Patent
Krishnaswamy

(10) Patent No.: US 11,323,530 B2
(45) Date of Patent: May 3, 2022

(54) PROXY AGENTS AND PROXY LEDGERS ON A BLOCKCHAIN

(71) Applicant: International Business Machines Corporation, Armonk, NY (US)

(72) Inventor: Dilip Krishnaswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/001,218

(22) Filed: Jun. 6, 2018

(65) Prior Publication Data

US 2019/0379754 A1    Dec. 12, 2019

(51) Int. Cl.
| | |
|---|---|
| *G06F 15/16* | (2006.01) |
| *H04L 67/56* | (2022.01) |
| *G06F 16/18* | (2019.01) |
| *H04L 9/06* | (2006.01) |
| *H04L 9/32* | (2006.01) |
| *H04L 67/104* | (2022.01) |

(52) U.S. Cl.
CPC .......... *H04L 67/28* (2013.01); *G06F 16/1805* (2019.01); *H04L 9/0637* (2013.01); *H04L 9/3236* (2013.01); *H04L 9/3247* (2013.01); *H04L 67/104* (2013.01); *H04L 2209/38* (2013.01)

(58) Field of Classification Search
CPC ..... H04L 67/28; H04L 9/0637; H04L 9/3236; H04L 9/3247; H04L 67/104; H04L 2209/38; H04L 67/289; H04L 67/1095; G06F 16/1805
See application file for complete search history.

(56) References Cited

U.S. PATENT DOCUMENTS

| | | | |
|---|---|---|---|
| 10,121,025 B1* | 11/2018 | Rice | H04L 9/0643 |
| 10,230,756 B2* | 3/2019 | Androulaki | H04L 63/123 |
| 10,360,191 B2* | 7/2019 | Christidis | G06F 16/152 |
| 10,361,869 B2* | 7/2019 | Gorman | H04L 9/3239 |
| 10,387,684 B2* | 8/2019 | Carey | G06F 21/64 |
| 10,438,170 B2* | 10/2019 | Kozloski | G06F 8/71 |
| 10,979,452 B2* | 4/2021 | Kundu | G06F 16/1805 |
| 2001/0044787 A1* | 11/2001 | Shwartz | G06Q 20/00 705/78 |
| 2016/0261690 A1* | 9/2016 | Ford | H04L 41/0806 |
| 2016/0292672 A1* | 10/2016 | Fay | G06Q 20/36 |
| 2017/0103167 A1* | 4/2017 | Shah | G06F 11/1464 |
| 2017/0103468 A1* | 4/2017 | Orsini | G07F 15/003 |
| 2017/0126802 A1* | 5/2017 | Koorapati | G06F 16/1748 |
| 2017/0140408 A1* | 5/2017 | Wuehler | G06Q 30/0207 |
| 2017/0154331 A1* | 6/2017 | Voorhees | H04L 67/20 |
| 2017/0155515 A1* | 6/2017 | Androulaki | H04L 9/008 |
| 2017/0178127 A1* | 6/2017 | Kravitz | G06Q 20/401 |
| 2017/0213209 A1* | 7/2017 | Dillenberger | G06Q 20/3829 |
| 2017/0228731 A1 | 8/2017 | Sheng et al. | |
| 2017/0300898 A1 | 10/2017 | Campero et al. | |

(Continued)

OTHER PUBLICATIONS

Elli et al.—(Hyperledger Fabric: A Distributed Operating System for Permissioned Blockchains Apr. 26, 2018) (Year: 2018).*

(Continued)

*Primary Examiner* — Razu A Miah

(57) ABSTRACT

A method and system for reducing latencies in a blockchain network through the use of one or more proxy agents co-located with a first blockchain node processing a blockchain transaction. The one or more proxy agents are also associated with other blockchain nodes on a blockchain network.

19 Claims, 12 Drawing Sheets

(56) References Cited

U.S. PATENT DOCUMENTS

| | | | |
|---|---|---|---|
| 2017/0344435 A1* | 11/2017 | Davis | G06F 16/9535 |
| 2017/0344988 A1* | 11/2017 | Cusden | G06F 21/00 |
| 2017/0372300 A1* | 12/2017 | Dunlevy | G16Z 99/00 |
| 2018/0005186 A1* | 1/2018 | Hunn | G06F 40/103 |
| 2018/0020324 A1* | 1/2018 | Beauford | H04L 43/10 |
| 2018/0117447 A1* | 5/2018 | Tran | G16H 80/00 |
| 2018/0121909 A1* | 5/2018 | Christidis | G06Q 20/065 |
| 2018/0123779 A1* | 5/2018 | Zhang | H04L 9/0637 |
| 2018/0139056 A1* | 5/2018 | Imai | H04L 9/3236 |
| 2018/0219676 A1* | 8/2018 | Mattingly | H04L 63/08 |
| 2018/0285879 A1* | 10/2018 | Gadnis | H04L 9/3231 |
| 2018/0337847 A1* | 11/2018 | Li | H04L 67/1029 |
| 2018/0351732 A1* | 12/2018 | Wang | H04L 9/0637 |
| 2019/0182055 A1* | 6/2019 | Christidis | H04L 63/12 |
| 2019/0251199 A1* | 8/2019 | Klianev | G06Q 40/04 |
| 2019/0379754 A1* | 12/2019 | Krishnaswamy | G06F 16/1805 |
| 2020/0007322 A1* | 1/2020 | Weldemariam | G06F 16/27 |
| 2020/0382309 A1* | 12/2020 | Jayachandran | H04L 9/3247 |
| 2020/0396065 A1* | 12/2020 | Gutierrez-Sheris | H04L 67/1095 |

OTHER PUBLICATIONS

Androulaki et al. (Hyperledger Fabric: A Distributed Operating System for Permissioned Blockchains 2018) (Year: 2018).*

Li et al., "Towards scalable and private industrial blockchains." Proceedings of the ACM Workshop on Blockchain, Cryptocurrencies and Contracts. ACM, 2017. (Related).

Martinazzi, "The age of fintech: providing a liquid and efficient secondary market for security based crowdfunding with distributed ledger technologies." Diss, Politecnico Di Milano (2017) (Related).

Ortigosa, et al. "Secure Code Distribution based on BlockChain." Distribucio' N De Co' Digo Seguro, vol. 1, No. 1, Dec. 2016 (Related).

Samaniego et al., . "Virtual Resources & Blockchain for Configuration Management in IoT." Journal of Ubiquitous Systems & Pervasive Networks 9.2 (2017): 01-13. (Background).

E. Androulaki, "Hyperledger Fabric: A Distributed Operating System for Permissioned Blockchains." (Submitted on Jan. 30, 2018) https://arxiv.org/abs/1801.10228.

* cited by examiner

100A

PROXY AGENTS AND PROXY LEDGERS ON A BLOCKCHAIN

TECHNICAL FIELD

This application generally relates to peer participation a blockchain, and more particularly, to proxy agents and proxy ledgers on a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, permissioned blockchain systems incur significant latencies when providing distributed consensus between nodes. Depending on locations of the nodes participating in the blockchain network, and the latency involved in communication between those nodes, the performance of existing blockchain networks may be, for example, on the order of a few 10s of transactions per second or even more. Mainstream blockchain transactions processors, are able to support several thousand transactions per second, on average, with a peak rate of sometimes over 50,000, transactions per second. Most blockchain systems will likely expand into larger-scale capacities requiring increased performance to scale significantly beyond current capabilities. In traditional blockchain networks the nodes participating in the network process logic programmed in a smart contract layer that is coupled with the node's copy of the ledger. For transactions to be committed in the system, the different transactions are agreed upon by validating nodes (select nodes) via a consensus mechanism, the transactions are also ordered by a validating leader node, and each node commits transactions to its copy of the ledger.

In certain configurations, a set of endorsing nodes endorse the transactions, after which the transactions are ordered and committed to the respective ledgers. Depending on the latencies involved in the interactions between those endorsing nodes, the throughput performance of the system can be a limiting factor and may lead to delays and other system configuration concerns.

SUMMARY

One example embodiment may provide a method that includes one or more of identifying a blockchain transaction requiring endorsement by blockchain nodes, receiving endorsements at one blockchain node from proxy agents associated with one or more of the other blockchain nodes, determining to commit the blockchain transaction, storing the committed blockchain transaction in a ledger maintained by the one blockchain node.

Still another example embodiment may include a system that includes a first blockchain node configured to perform one or more of identify a blockchain transaction that requires commitment, execute a smart contract associated with the blockchain transaction by the first blockchain node, one or more proxy agents, co-located with the first blockchain node, wherein the one or more proxy agents are also associated with other blockchain nodes on a blockchain network, wherein the first blockchain node is also configured to commit the blockchain transaction, and store the blockchain transaction in a ledger maintained by the first blockchain node.

Yet another example embodiment may include a non-transitory computer readable storage medium configured to store instructions that when executed cause a processor to perform identifying a blockchain transaction requiring processing at a first blockchain node, executing a smart contract associated with the blockchain transaction by the first blockchain node and by one or more proxy agents co-located with the first blockchain node, and the one or more proxy agents are also associated with other blockchain nodes on a blockchain network, determining to commit the blockchain transaction, and storing the blockchain transaction in a ledger maintained by the first blockchain node.

DETAILED DESCRIPTION

Figure 1A:
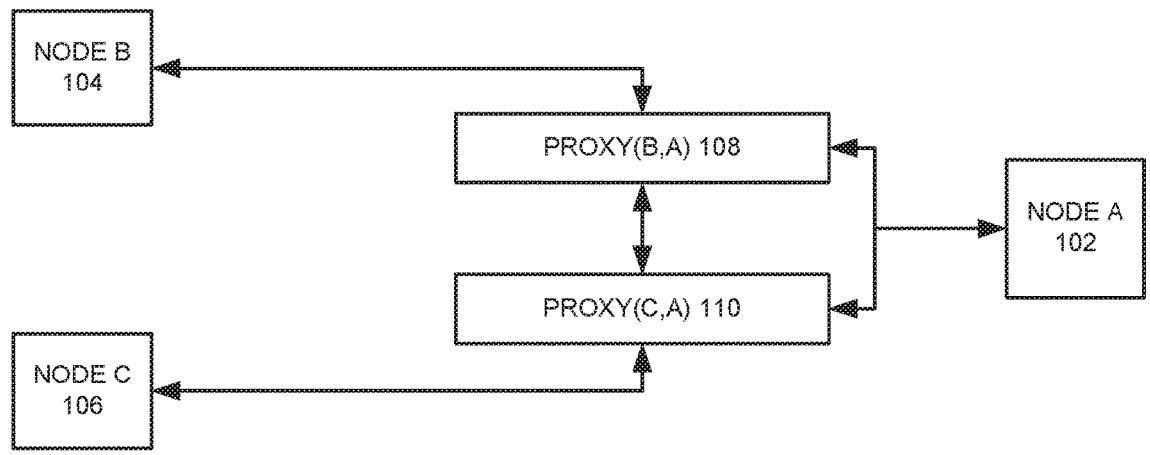
FIG. 1A illustrates a system network configuration of proxy ledger and endorsement management with proxy nodes, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide a proxy-based approach to maintain a distributed ledger (blockchain) across nodes in varying locations. Proxy smart contract agents and proxy ledgers may be deployed at each node on a blockchain network. Resources needed for transactions can be partitioned across agents representing a node. An aggregate ledger is maintained as a set of separate ledgers based on transactions submitted to each node. The system can provide flexibility to cache transactions at proxy nodes, enable fast transaction processing, provide flexibility in smart contract logic utilized across each node and with access control provided as needed. Scalability of the system is provided by the ability of each node to interact with the proxy agents from other nodes locally to update its ledger.

The throughput per node can reduce as the number of nodes, and in turn, proxy agents for consensus, increases. However, the system could be configured to limit the number of nodes involved in consensus decisions to ensure per-node throughput scalability since other proxy node agents can merely serve as non-validating agents. Overall system throughput will be based on the sum of the throughputs for the ledger at each node. As a result, due to the relative independence of processing at each node, this system can provide highly-scalable throughput with the localized processing of transactions, enabled by proxy agents at each node.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links.

A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Examples provide certain variables and identifiers which are defined to correspond with the elements of the figures. For example, 'N' is the set of blockchain nodes in the network, 'SC (n, m)' is smart contract code for one of the N nodes 'n' which is run on transactions submitted at node 'm', proxy (n, m) is the proxy agent for node 'n' running on node 'm', ledger (m, n) is the ledger for node 'm' maintained at node 'n', ledger (m, m) is a copy of the ledger for node 'm' that is maintained at node 'm', proxyledger (m, proxy(n,m)) is the ledger, Ag.ledger(m) is the aggregate set of all ledgers (ledger (i, m)) that are maintained at node 'm' where i∈N.

According to example embodiments, at each node in the blockchain network, proxy smart contract agents corresponding to other node(s) are deployed at proxy node agents which are collocated with a particular node and/or are located in close proximity to certain nodes to provide assistance with peer node operations when the peers are not close enough to maintain a certain degree of service. When any consensus or endorsement blockchain transaction requirement and/or other communications are required, at a first node 'A', to process a transaction submitted at node 'A', the proxy smart contract agents, installed at or nearer to node 'A' than the other peers, will execute on behalf of the other nodes to process the transaction and provide the necessary input. After successful processing of the transaction, a processed transaction is committed to ledger 'A' which is maintained at node 'A'. The proxy smart contract agents also maintain ledgers and commit transactions to their own copies of the ledger (A, A). A proxy agent on behalf of node 'B' creates and updates its copy of ledger 'A' called ledger (A, proxy (B, A)). Periodically, a proxy smart contract on behalf of another node 'B' sends an updated set of blocks to node 'B'. At node 'B', a copy of the ledger for node 'A' is maintained (ledger (A, B)) such that ledger (A, B) is updated when node 'B' receives an update from proxy (B, A) based on updates to ledger (A, proxy (B,A)).

FIG. 1A illustrates a system network configuration of proxy ledger and endorsement management with proxy nodes, according to example embodiments. Referring to FIG. 1A, each node has a copy of the ledger based on transactions submitted at that node, along with a copy of the ledgers from other nodes based on transactions submitted to those nodes. In this example 100A, the proxy nodes 108 and 110 interact with node 'A' 102 to maintain a ledger for node 'A'. Nodes B 104 and C 106 synchronize updates to the ledger on node A based on updates from their own respective proxy nodes.

In one example, a transaction may be conducted at node A, based on goods supplied by node C, which are shipped via node B. When the goods reach node A, a transaction is made by node A to nodes C and B and is recorded by the ledger for node A at node A, and at proxy ledgers managed by proxy agents for nodes C and B, which are co-located at node A, where the proxy ledgers replicate the recording of transactions stored in the ledger for node A at node A. The co-located aspect may be installed on the same node and/or installed on a management platform node operating with the node. At a later point in time, the respective nodes C and B receive information regarding the transaction via their respective proxy agents co-located at node A. Alternatively, rather than a transfer being conducted, the ledger at node A can merely record the event that the goods had arrived at node A, and this information is replicated at proxy ledgers managed by the proxy agents for nodes C and B, which are again co-located with node A. At a later point in time, the respective nodes C and B receive information regarding the transaction from their respective proxy agents and may update their own custom ledgers in any manner suitable to their recordation procedures, however, this does not have to occur contemporaneously with the transaction itself.

Figure 1B:
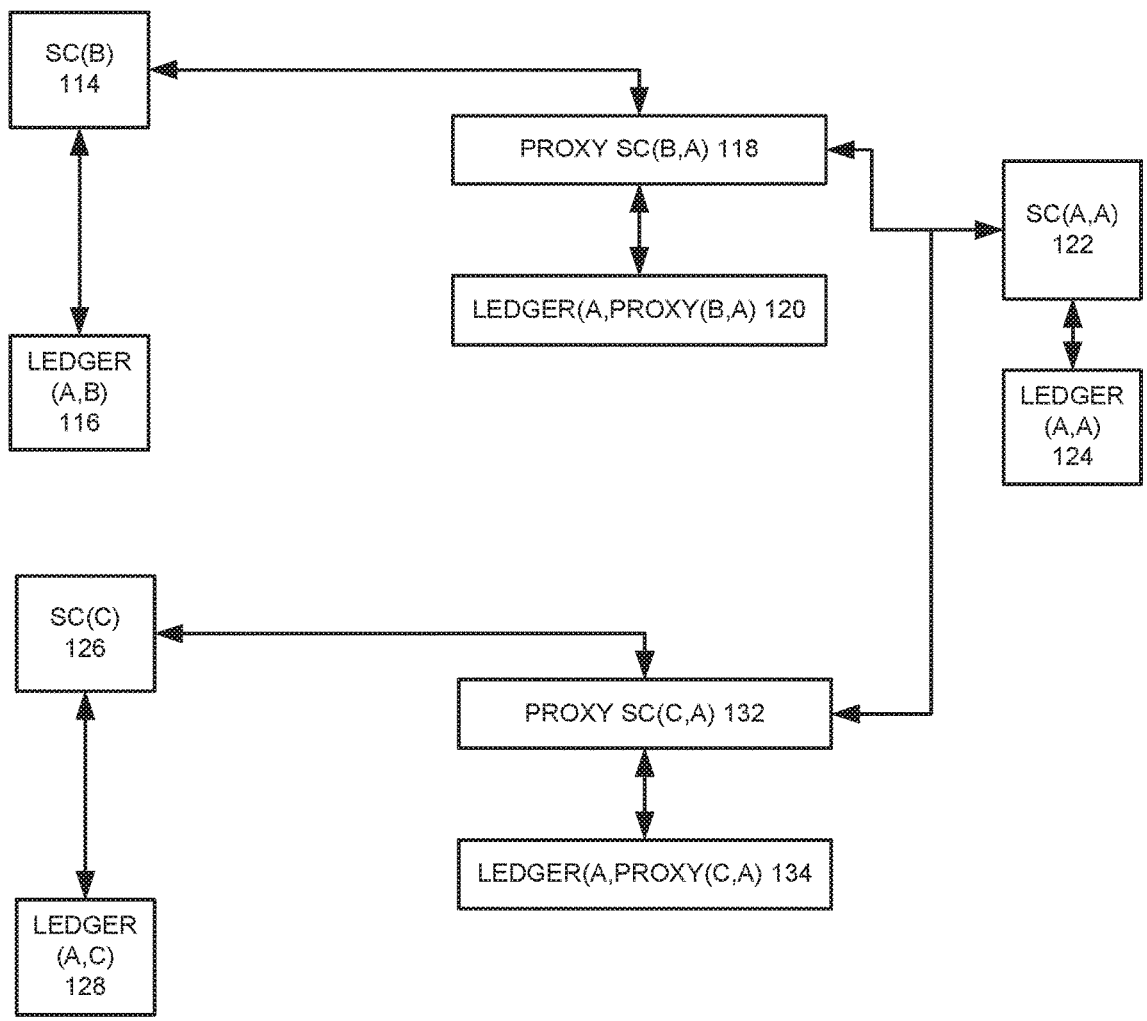
FIG. 1B illustrates a system network configuration of proxy ledger and endorsement management, according to example embodiments.

FIG. 1B illustrates a system network configuration 100B of proxy ledger and endorsement management, according to example embodiments. Referring to FIG. 1B, the aggregate ledger (Ag.ledger (A)) may include ledger (A, A) 124 and the copies of ledgers from other nodes ledger (B, A), ledger (C, A), etc. The aggregate ledger (Ag.ledger (B)) may include ledger (B, B) and the copies of ledgers from other nodes, such as ledger (A, B) 116 and ledger (C, B). The aggregate ledger (Ag.ledger (C)) includes ledger (C, C) and the copies of ledgers from other nodes such as ledger (A, C) 128 and ledger (B, C). The entire blockchain ledger system is thus based on the aggregate of ledgers which is based on transactions submitted at each of the nodes. Not all ledger copies identified above are included in the diagram 100A for simplicity reasons.

For the example of a transaction associated with a transfer for goods received, a smart contract SC(A,A) 122 for node A, or a proxy smart contract for node B at a proxy node denoted as ProxySC(B,A) 118, which is based on SC(B) 114, and/or a proxy smart contract for node C, located at node A, and denoted as ProxySC(C,A) 132, which is based on SC(C) 126, can be used to determine if the transaction balance for node A is adequate to cover the transaction requirements for the goods. Node A also has its own smart contract SC(A, A) 122. For the example of merely recording the receipt of the goods at node A, such smart contracts can check for constraints, such as whether the amount of goods received was adequate as reflected in the transaction order, or if the type of goods received was correct, or if the goods were received prior to a deadline, etc.

Each proxy ledger, such as ledger (A, proxy(B,A)) 120 does not represent the entire ledger (A, A) 124. The same scenario exists for ledger (A, proxy(C,A)) 134. After committing to ledger (A, B) at node B, the proxy ledger can delete the blocks that it contains. However, data verification time can increase if a read from the blockchain system for a past transaction requires consensus across all nodes. Alternatively, after committing to ledger (A,B) at node B, the proxy ledger can continue to maintain a cache of all recent transactions. A cache-based approach that invalidates least-recently-used (LRU) transactions can ensure data verification across nodes for past transactions occurs fast and is performed locally at each node along with participation from other nodes. The frequency of updates between the node proxy agent and its parent node can vary depending on the size of the cache available. Alternatively, the size of the cache can vary based on the frequency of updates between a node proxy agent and its parent node based on a dynamic load in the network across nodes, and cache storage space availability. Instead of a single ledger across all nodes and attempting to maintain consensus across all nodes with one ledger, this type of system maintains a set of ledgers where this set includes one ledger for each node. Proxy node agents including a proxy smart contract agent and proxy ledger are deployed at each node. Proxy smart contract agents are used to enable fast processing and commitment of transactions to the ledger at each node. The agents may be a separate device but are preferably implemented as a software module operating on a peer node computer(s). The proxy nodes synchronize with the nodes that they are assigned to represent by performing a bulk update for a ledger from another node. Multiple channels can be supported for each individual ledger. Access control can be utilized to provide access to each proxy agent at a particular node. Access control can be varied per channel if needed. The smart contract that node B is going to execute at node A, via its proxy at node A, can be different from the smart contract that node B executes on its own node for its own ledger. This approach may customize the needs of the respective ledgers at each node and can provide additional flexibility in the system. The proxy agents may be blockchain peers that operate by sending updates to other peers that they are assigned to represent.

A proxy agent can provide a proactive update of merely metadata, such as the Merkle tree hash, and a list of transactions committed, associated with blocks with a further non-urgent/passive update of actual content of transactions of blocks. Communication between proxy nodes and the nodes that they represent could be performed at periods of low network utilization, for example, when the network is identified as having less traffic, such as during the evening hours of the United States, or Asia or other parts of the world generating high transaction traffic. Information is eventually updated to the proxy ledgers. Resources, such as supplies can be distributed and partitioned across agents representing a node, and predictively as well to avoid double spending, and to enable transactions to proceed locally.

An overall global resource may be partitioned across different geographies. For example, assuming resource 'A' is partitioned as 'A'=A1+A2+A3 across Singapore (region 1), Australia (region 2), and New Zealand (region 3). Next, it is assumed that A2 changed to A2New and A3 changed to A3New at Australia and New Zealand, respectively, and was committed accordingly, but Singapore has yet to receive the update information. Now, the latest value of A1 is known at 'SG', the latest value of A2 is owned at 'Aus', and A3 is owned at New Zealand. An overall global resource may be partitioned across different geographies. For example, resource 'A' from Singapore (SG) is partitioned as A=A1+A2+A3 across Singapore (SG) (region 1), Australia (AUS) (region 2), and New Zealand (NZ) (region 3). Then the amounts 'A2' and 'A3' are allocated from SG to AUS and NZ. This allows transactions at AUS and NZ, involving resource A, to be locally committed based on the local availability of resource A. At a future point in time, portions of resource A may be reassigned to a different region as needed, while permitting adequate amounts of resource A to be available in each region for ongoing transactions. Prediction engines may be used to predict the amount of resources required in a given region for a given future time duration.

In a global peer node distribution scenario, complex queries submitted to peers would have to be sent across distant geographies to determine overall resource availability, and would incur the traditional latency costs of the distributed network. However, it is expected that the frequency of such queries will be small, and that most queries will be addressed to local resources and managed locally. In one example, in the SG/AUS/NZ example, it is assumed that A2 changed to A2New and A3 changed to A3New, at AUS and NZ, respectively, and were committed accordingly, however SG is not yet aware about the transactions. Now, the latest value of A1 is known at SG, and the latest value of A2 is owned at AUS, and A3 is owned at NZ. When a global query on 'A' is submitted, A1 is obtained, if A1 has not changed, A2New is obtained and A3New is also obtained from the three respective regions. The global state is derived for resource 'A' as ANew=A1+A2New+A3New. However, this query would have to cross the three different and far away geographies, and would incur the higher latency of a traditional network across the regions.

According to example embodiments, cloud deployments in each geographical location can use virtual machine/container partitions for nodes representing different organizations, such as a proxy node of a remote organization versus a local node for a local organization, which are co-located in the same cloud infrastructure so that the infrastructure provides the trust separation with virtual machine (VM)/container partitions while minimizing latency due to the co-location functionality. A node or a proxy node function may be replicated to provide higher availability for load balancing transactions. Endorsement requests can be distributed across replicated nodes for load balancing, however, commit transactions would have to be executed by all replicated versions of a node or a proxy node at a given location. The overall system, including resource and ledger partitioning across geographies, and which includes passive coordination with proxy ledgers, could be termed a 'superledger' due to the aggregate ledger feature being a 'superset' of the respective ledgers maintained by the nodes.

Figure 2A:
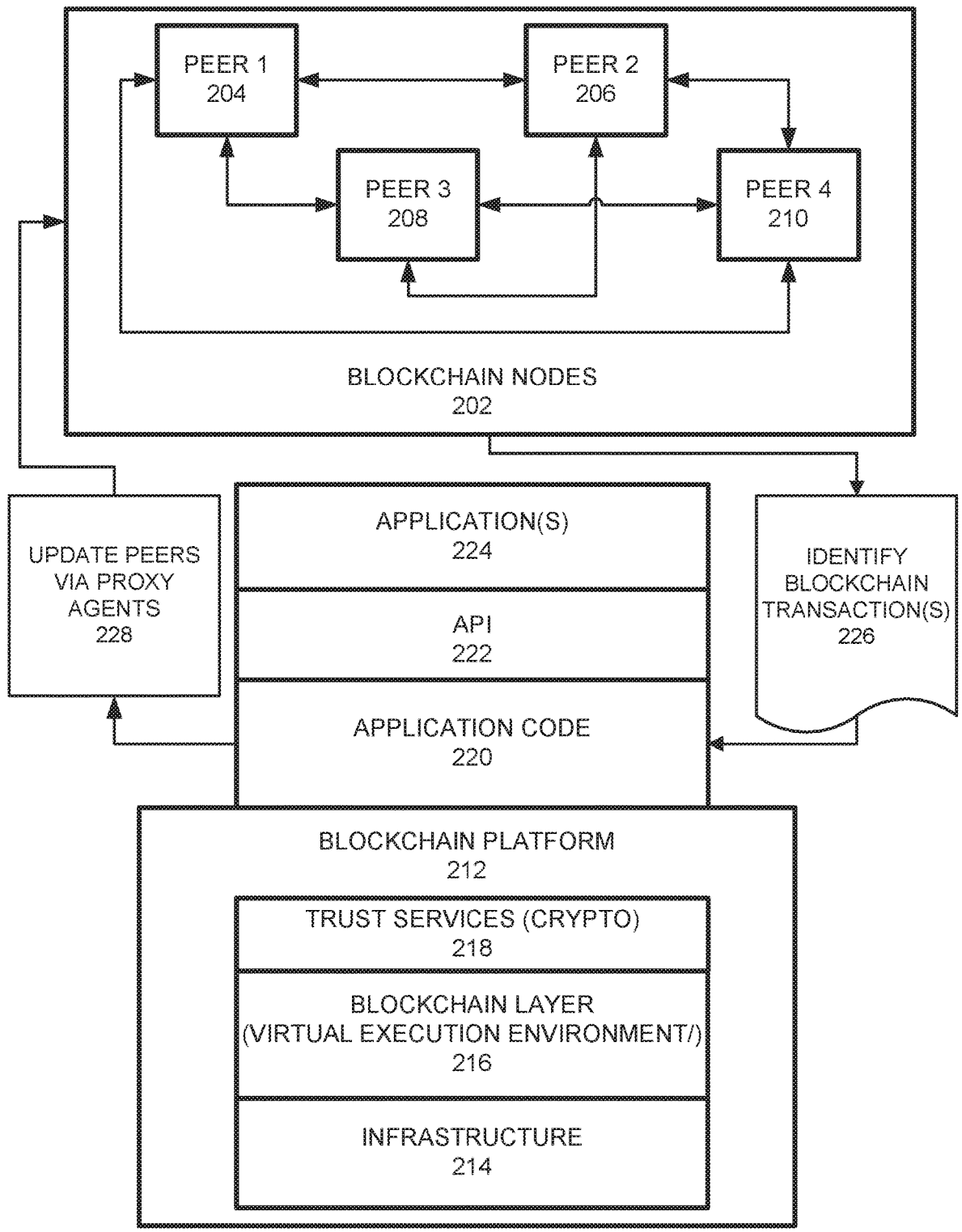
FIG. 2A illustrates an example peer node blockchain architecture configuration for proxy agent transaction endorsement, according to example embodiments.

FIG. 2A illustrates a blockchain architecture configuration 200A, according to example embodiments. Referring to FIG. 2A, the blockchain architecture 200A may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200A. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain blockchain transactions are identified 226 as potential transactions which require endorsement or other blockchain peer services. Once the transaction(s) is endorsed by one or more of the blockchain peer nodes, the transaction may be updated via the proxy agents 228 to the ledgers maintained by the peers. The proxy agents may have been responsible for providing the necessary endorsements to commit the transaction.

Figure 2B:
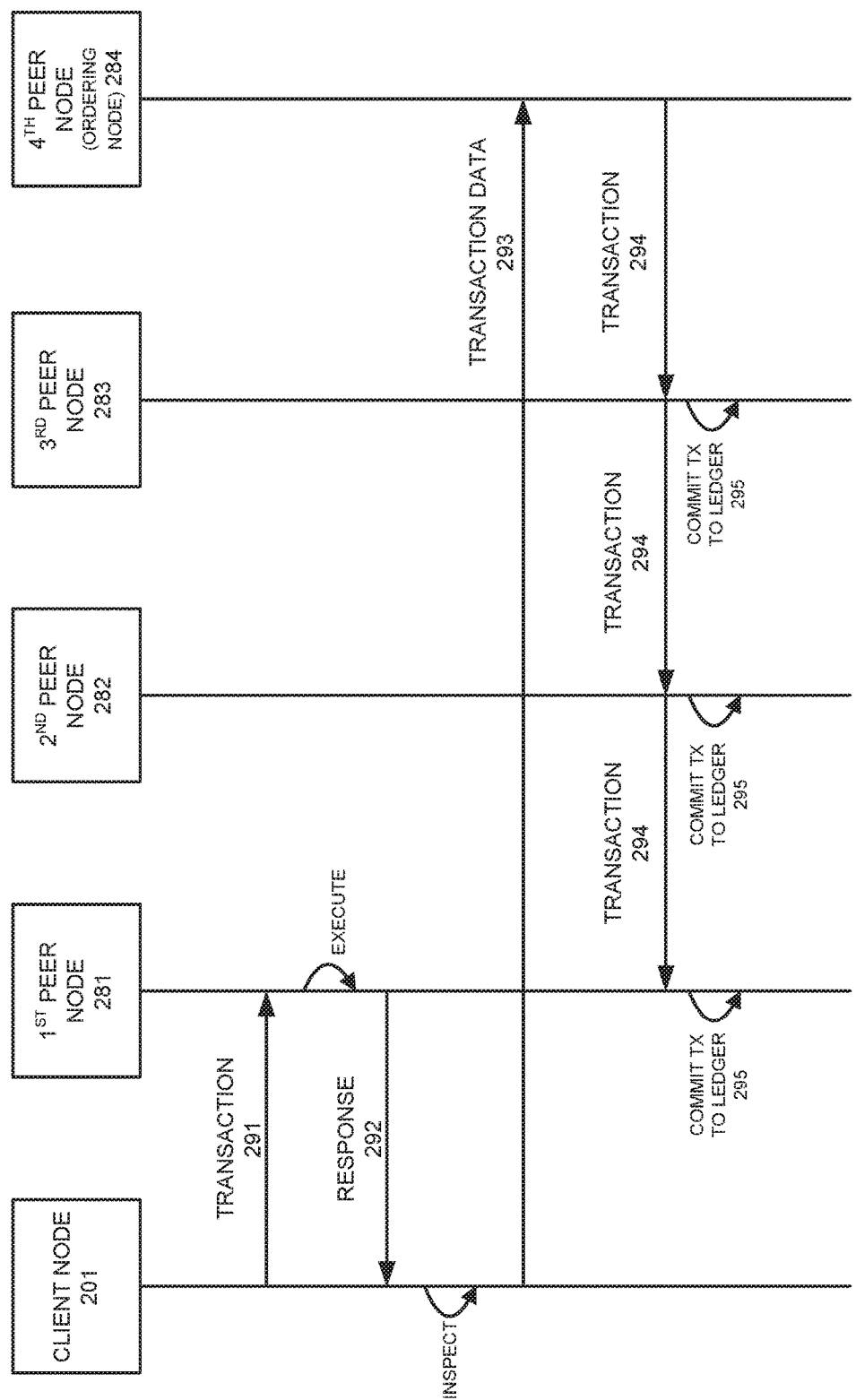
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
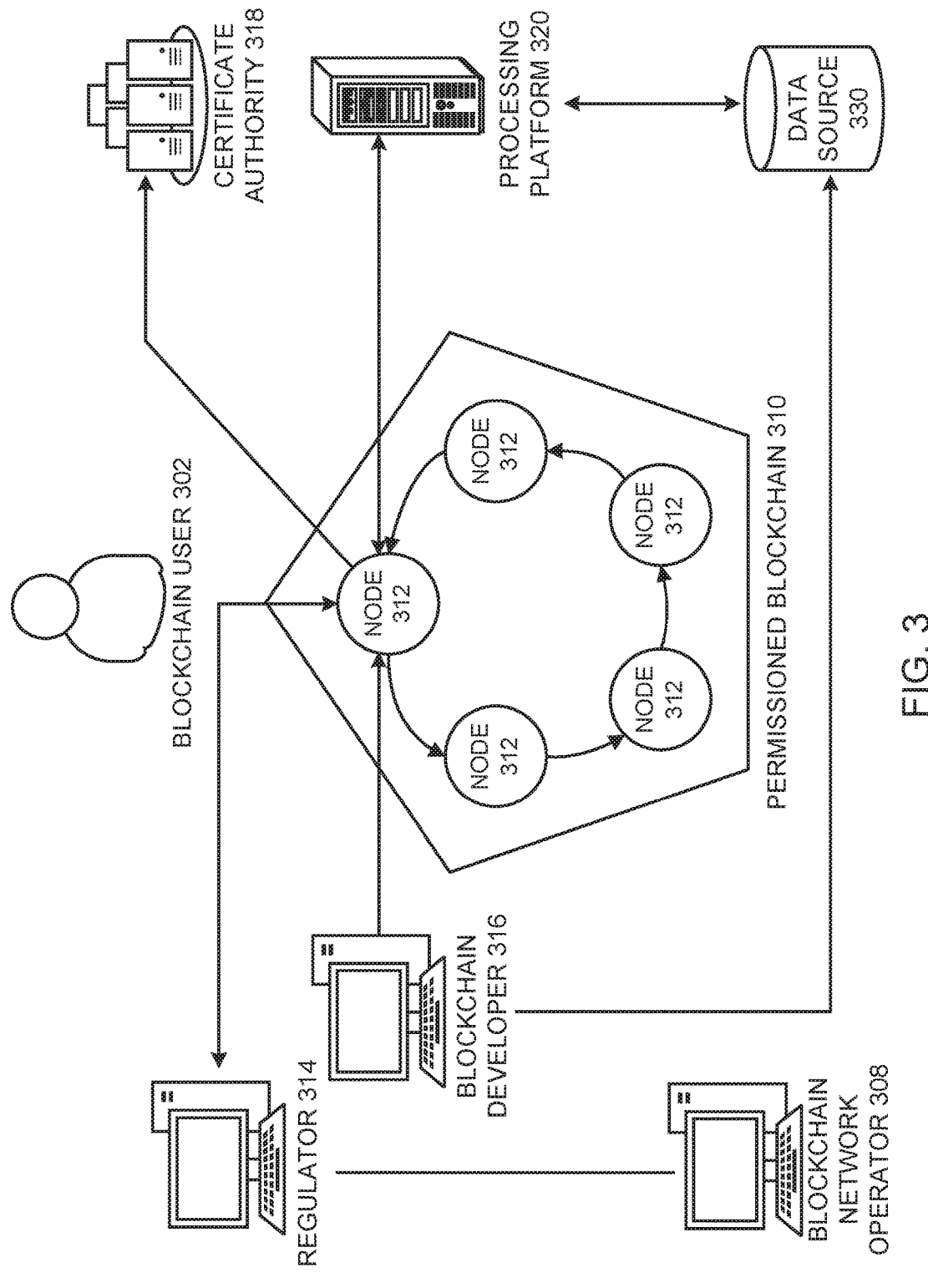
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
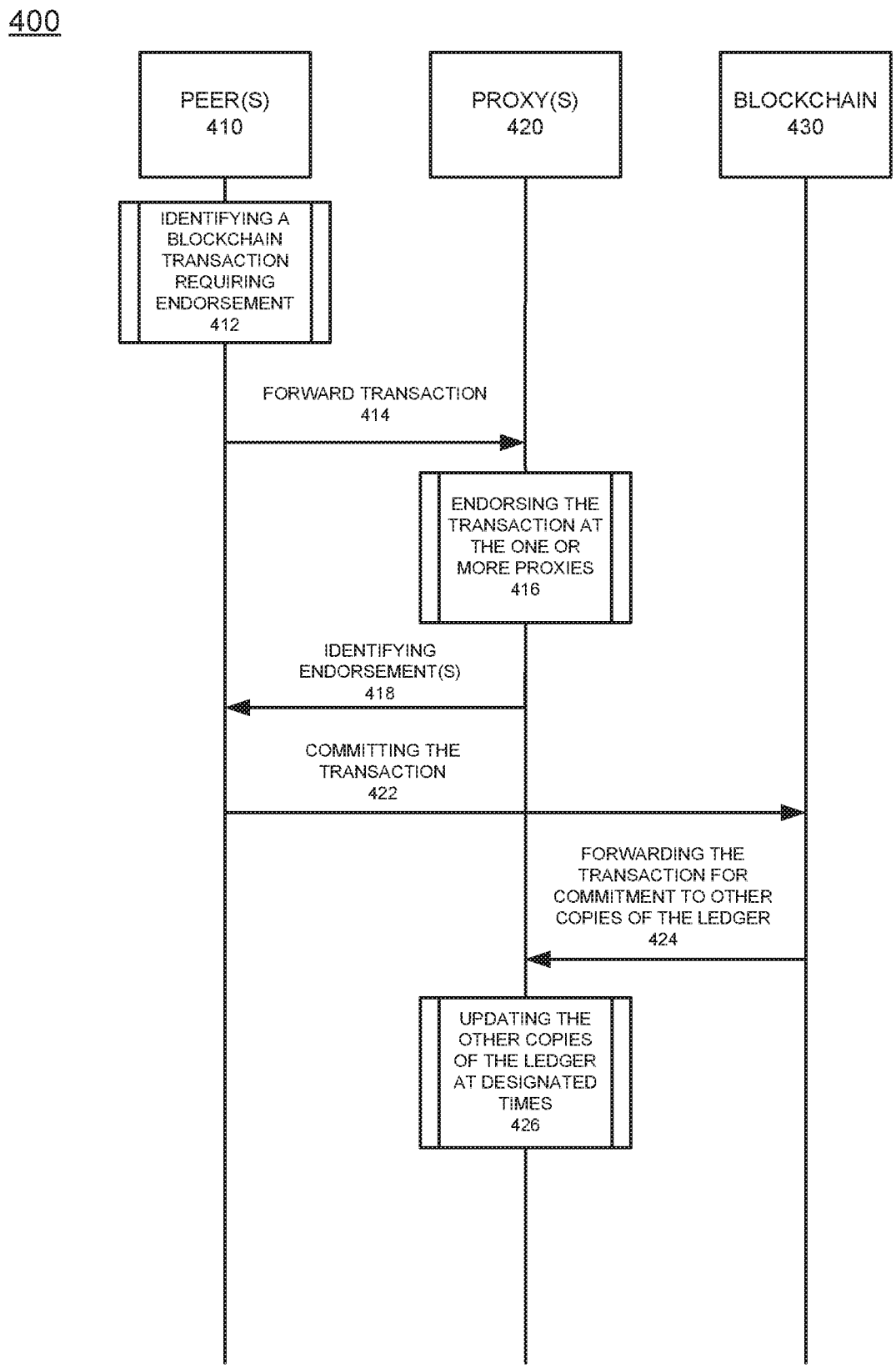
FIG. 4 illustrates a system messaging diagram for performing peer node management via proxy agents, according to example embodiments.

FIG. 4 illustrates a system messaging diagram for performing peer node management via proxy agents, according to example embodiments. Referring to FIG. 4, the example configuration 400 includes one or more peers 410 and one or more proxies 420 corresponding to the peers 410. Also, a blockchain 430 may represent one or more of the ledgers maintained by the peers 410 and the proxies 420. In operation, a blockchain transaction requiring endorsement is identified 412 by one or more of the peers 410, and the transaction is forwarded 414 to one or more proxies to be endorsed. The proxies may act like peers by performing the endorsement operations necessary to endorse the transactions 416. The endorsements are identified 418 and are committed 422 to the blockchain 430. The transactions are forwarded to the other ledgers 424 for commitment to their respective ledgers. At the appropriate times, the other ledger copies maintained by other peers are updated based on update policies 426, such as designated times, and/or network threshold conditions (e.g., time of day, network performance metrics, etc.).

Figure 5A:
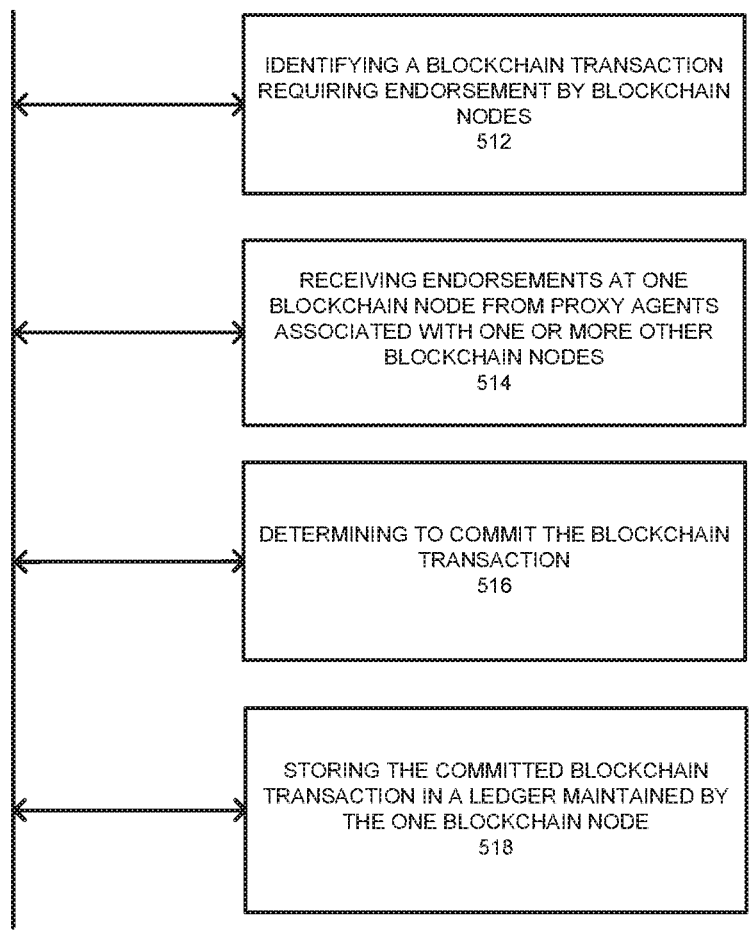
FIG. 5A illustrates a flow diagram of an example method of proxy agent management in a blockchain, according to example embodiments.

FIG. 5A illustrates a flow diagram of an example method of proxy agent management in a blockchain, according to example embodiments. Referring to FIG. 5A, the method 500A may provide identifying a blockchain transaction requiring endorsement by blockchain nodes 512, receiving endorsements at one blockchain node from proxy agents associated with one or more of the other blockchain nodes 514, determining to commit the blockchain transaction 516 once the necessary endorsement are identified, and storing the committed blockchain transaction in a ledger maintained by the one blockchain node 518. In this example, one peer node is the primary peer node performing the commitment consensus feature. The other nodes use their proxies to maintain a timely response to the needed endorsement requests. Each of the nodes and the proxies may maintain a ledger which may be a part of the aggregate ledger of all transactions. The proxy agents are installed on the one blockchain node as software modules, or may be stand alone devices operating in a closer proximity to the node.

The method may also include determining a period of time with lower network latency in order to determine an optimal time to relay ledger updates. The method may also include, during the period of time with lower network latency, transmitting updates from the proxy agents to one or more of the other blockchain nodes to update ledgers associated with the other blockchain nodes, storing the blockchain transaction at proxy ledgers associated with the proxy agents, deleting the blockchain transaction at the proxy ledgers after transmitting the updates to the one or more of the other blockchain nodes, or instead, caching the blockchain transaction at the proxy ledgers after transmitting the updates to the one or more of the other blockchain nodes.

Figure 5B:
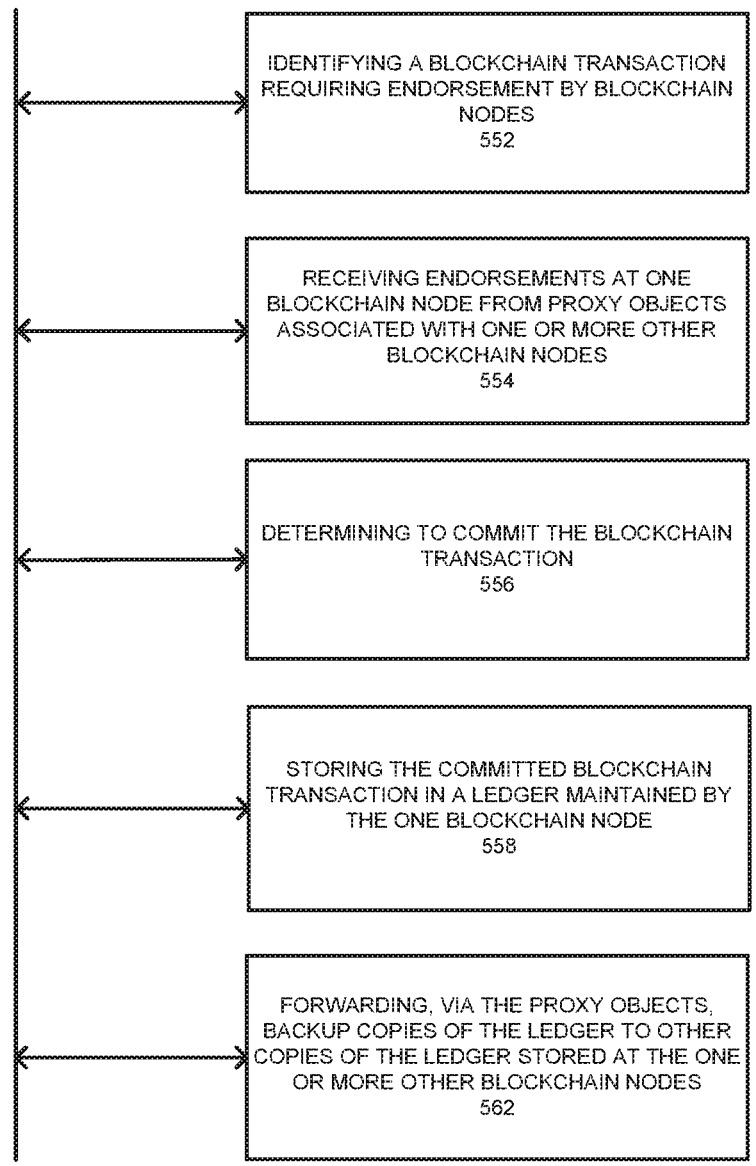
FIG. 5B illustrates a flow diagram of another example method of proxy agent management in a blockchain, according to example embodiments.

FIG. 5B illustrates a flow diagram of another example method of proxy agent management in a blockchain, according to example embodiments. Referring to FIG. 5B, the method 500B provides identifying a blockchain transaction requiring endorsement by blockchain nodes 552, receiving endorsements at one blockchain node from proxy objects associated with one or more of the other blockchain nodes 554, determining to commit the blockchain transaction 556, storing the committed blockchain transaction in a ledger maintained by the one blockchain node 558, and forwarding, via the proxy objects, backup copies of the ledger to other copies of the ledger stored at the one or more other blockchain nodes 562.

In addition to maintaining a copy of the ledger at the first blockchain node, copies of the ledger and/or updates to the ledger may be passively forwarded to the other blockchain nodes/peers during times when the network latency is determined to be less than optimal network usage times. The proxy objects exist to forward the recent transactions to other blockchain nodes. The proxy objects may be created and defined during an initial ledger update process and may be triggered to share the updated transactions at the appropriate times. The proxy objects may be defined by thresholds, such as network latency, times of day or other times when it is determined that the updates can be forwarded without causing additional network latencies.

Figure 5C:
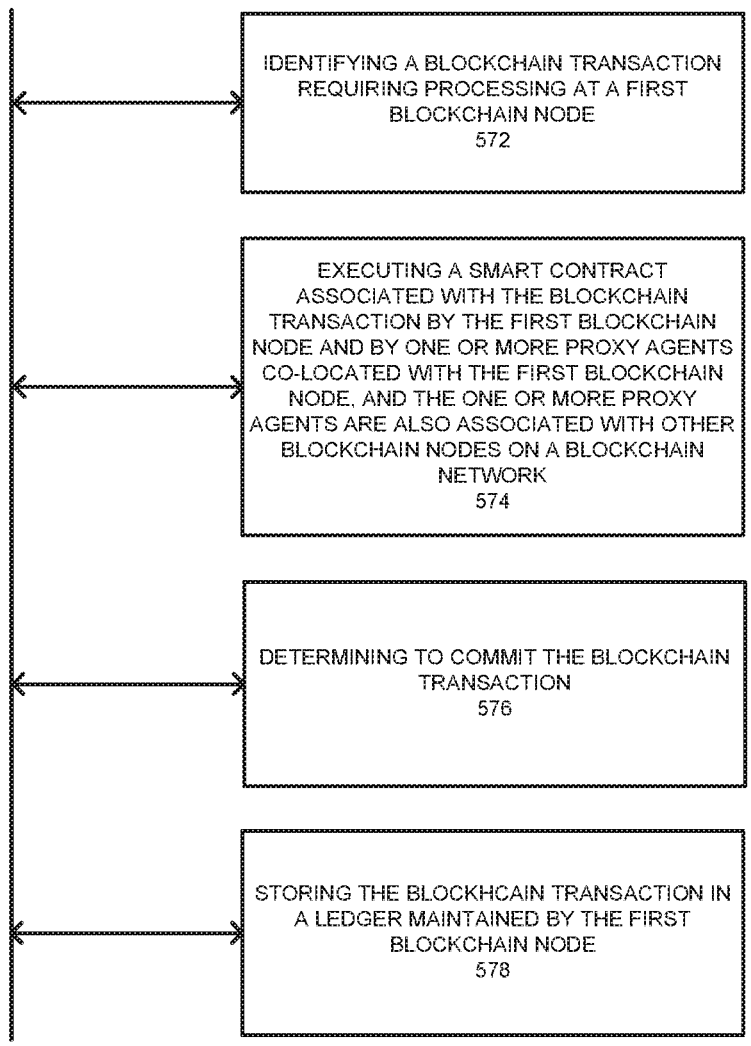
FIG. 5C illustrates a flow diagram of another example method of proxy agent management in a blockchain, according to example embodiments.

FIG. 5C illustrates a flow diagram of another example method of proxy agent management in a blockchain, according to example embodiments. Referring to FIG. 5C, the example provides a method 570, that includes identifying a blockchain transaction requiring processing at a first blockchain node 572, executing a smart contract associated with the blockchain transaction by the first blockchain node and by one or more proxy agents co-located with the first blockchain node, wherein the one or more proxy agents are also associated with other blockchain nodes on a blockchain network 574, determining to commit the blockchain transaction 576, storing the committed blockchain transaction in a ledger maintained by the first blockchain node 578.

The method also includes receiving endorsements at the first blockchain node from the one or more proxy agents, executing the smart contract node by one or more of the other blockchain nodes, determining to commit the blockchain transaction by the one or more of the other blockchain nodes, and storing the committed blockchain transaction in other ledgers maintained by each of the one or more other blockchain nodes. The one or more proxy agents may be installed on the first blockchain node or are at a co-located position within a certain proximity of the first blockchain node. The co-located position is based on a determined latency for communication between the first blockchain node and the one or more proxy agents not exceeding an upper latency threshold, or the co-location position is based on a geographical distance between the first blockchain node and a physical distance between a processing platform used for the one or more proxy agents. The method may also provide transmitting updates from the one or more proxy agents to the other blockchain nodes to update copies of the ledger at the other blockchain nodes, storing the blockchain transaction at a proxy ledger associated with the one or more proxy agents, caching the blockchain transaction at the proxy ledger after transmitting the blockchain transaction to the one or more of the other blockchain nodes, and deleting the blockchain transaction at the proxy ledger after transmitting the transaction to the other blockchain nodes, and after receiving a confirmation of receipt of the transaction from the other blockchain nodes. Other features may provide permitting resources to be partitioned across nodes to enable transactions to be committed locally at the one node prior to its transmittal by proxy agents to the respective nodes. The caching may be performed based one or more constraints such as based on the space availability for caching, or a pre-specified time horizon for caching, or based on a caching policy such as an LRU policy for caching. The proxy agents serve as the local representation of the respective peers on the blockchain network to permit transactions to be committed locally, prior to transmittal of the committed transactions to the respective peers. Each node on the blockchain network maintains an aggregate ledger that includes a ledger for that node, along with replicated versions of ledgers of other peers on the blockchain network. Each of the ledgers which are part of the aggregate ledger have a different genesis block identifying different sets of source and origination information.

Figure 6A:
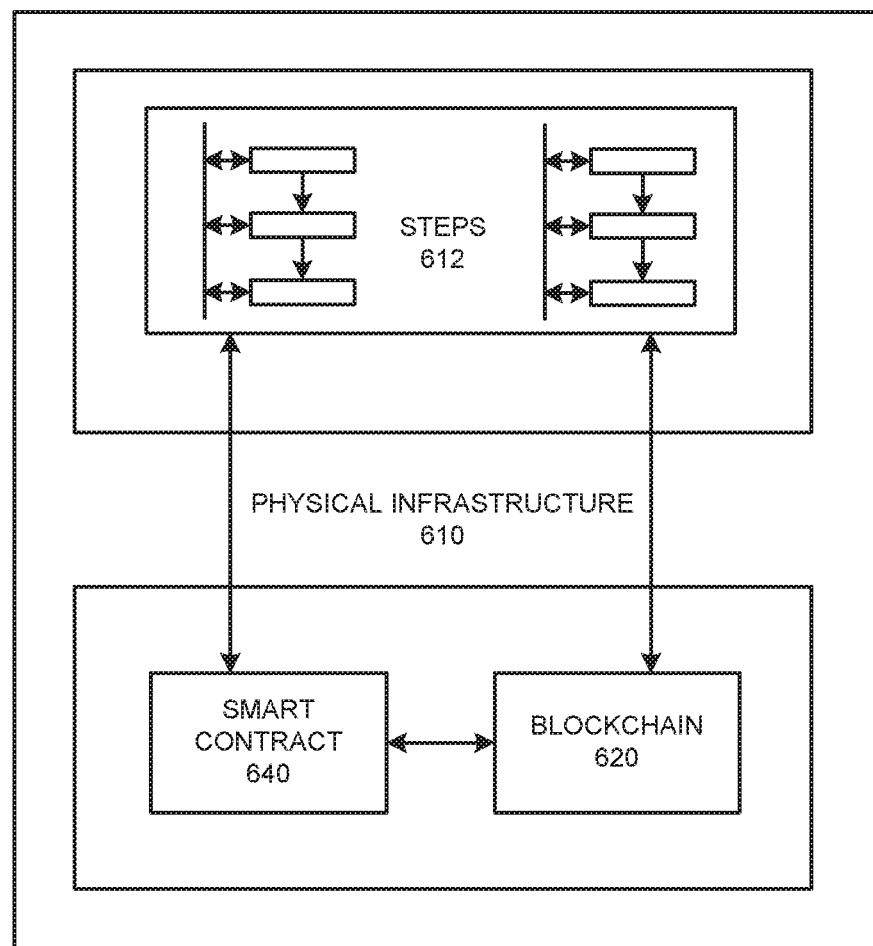
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
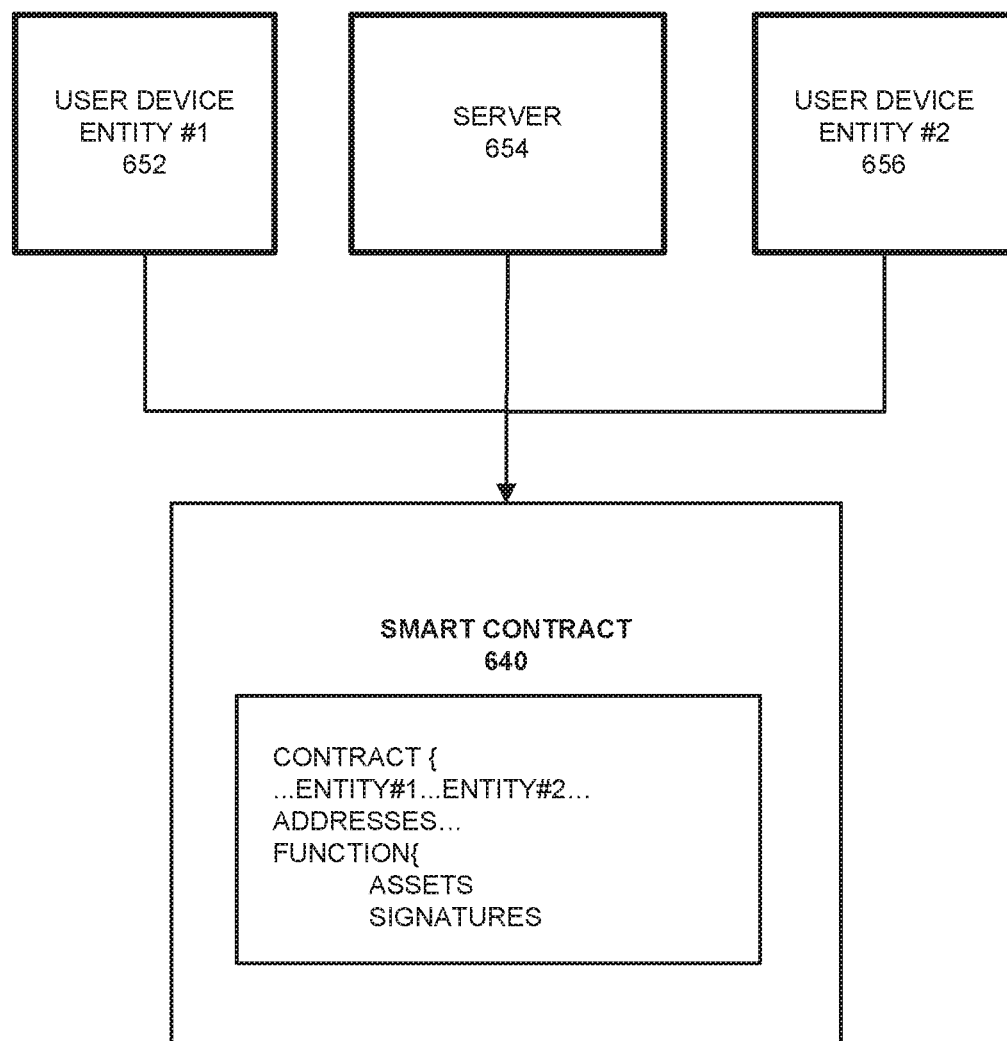
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
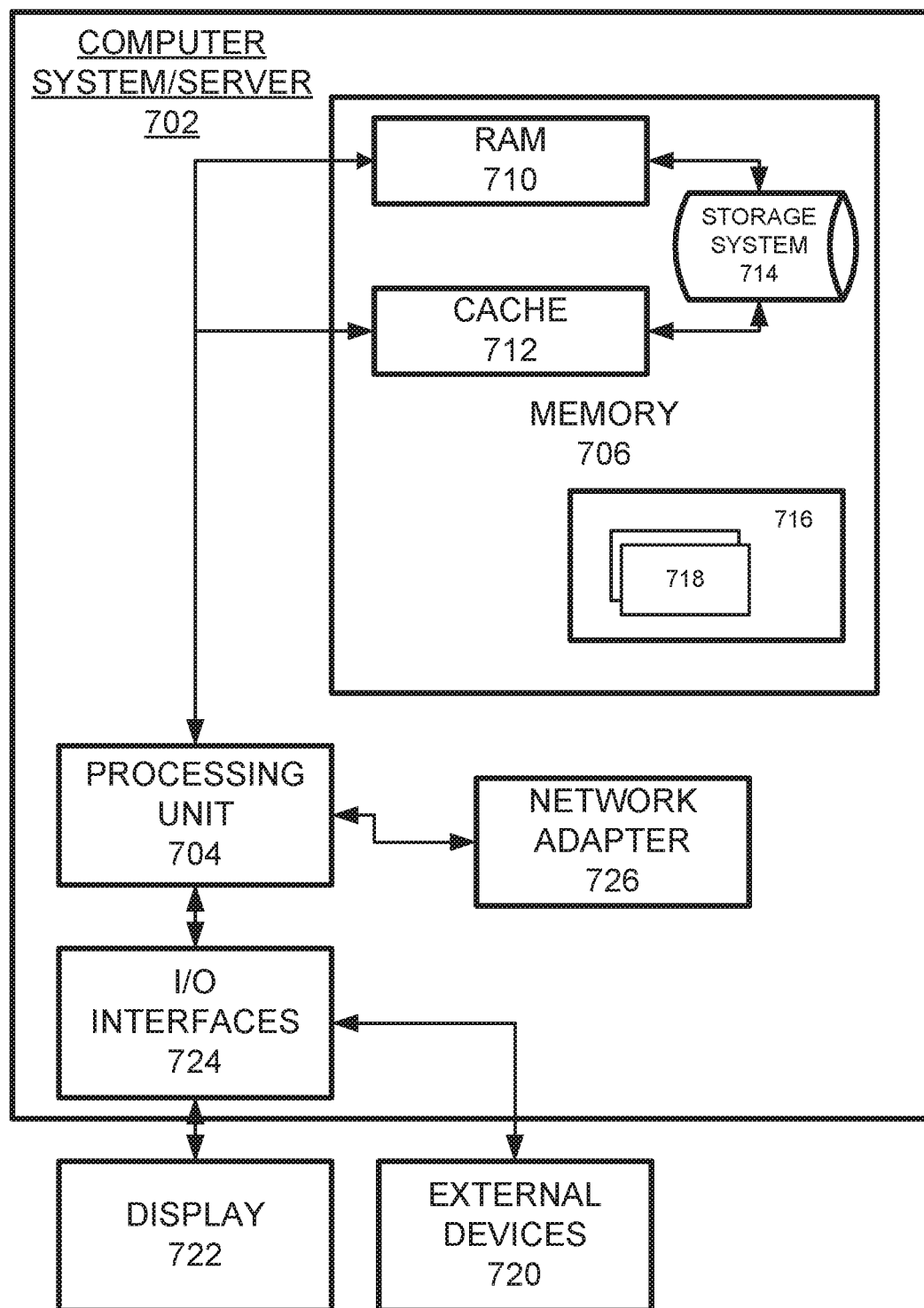
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    identifying a blockchain transaction requiring processing at a first blockchain node in a blockchain work including another blockchain node;
    executing a smart contract associated with the blockchain transaction by the first blockchain node and by a proxy agent acting on behalf of the another blockchain node, the proxy agent being co-located with the first blockchain node and the proxy agent storing a proxy ledger of transactions submitted only to the first blockchain node;
    determining to commit the blockchain transaction; and
    storing the blockchain transaction in a ledger maintained by the first blockchain node.

2. The method of claim 1, comprising:
    receiving an endorsement at the first blockchain node from the proxy agent.

3. The method of claim 1 further comprising:
    executing the smart contract node by one or more other blockchain nodes in the blockchain network;
    determining to commit the blockchain transaction by the one or more other blockchain nodes; and
    storing the committed blockchain transaction in other ledgers maintained by each of the one or more other blockchain nodes.

4. The method of claim 1, wherein the proxy agent is installed on the first blockchain node.

5. The method of claim 1, wherein the proxy agent is within a certain geographical distance of the first blockchain node.

6. The method of claim 1, further comprising:
    transmitting updates from the proxy agent to one or more other blockchain nodes, in the blockchain network, to update copies of the other ledgers at the one or more other blockchain nodes.

7. The method of claim 1, further comprising:
    caching the blockchain transaction at the proxy ledger after transmitting the blockchain transaction to the one or more other blockchain nodes; and
    deleting the blockchain transaction from the proxy ledger after transmitting the blockchain transaction to the other blockchain nodes, and after receiving a confirmation of receipt of the blockchain transaction from the other blockchain nodes.

8. A system, comprising:
    a first blockchain node in a blockchain network including another blockchain nodes, the first blockchain node comprising a processing device configured to:
        identify a blockchain transaction that requires commitment, and
        execute a smart contract associated with the blockchain transaction by the first blockchain node; and a proxy agent, implemented via a computer and configured to act on behalf of the other blockchain node, co-located with the first blockchain node, the proxy agent being configured to:
    execute the smart contract with the first blockchain node, where the proxy agent stores a ledger of transactions submitted only to the first blockchain node,
wherein the first blockchain node is also configured to:
    commit the blockchain transaction, and
    store the blockchain transaction in a ledger maintained by the first blockchain node.

9. The system of claim 8, wherein the first blockchain node is further configured to:
    receive an endorsement from the proxy agent.

10. The system of claim 8, wherein one or more other blockchain nodes in the blockchain network are configured to:
    execute the smart contract node by a determination to commit the blockchain transaction to the one or more other blockchain nodes, and
    store the committed blockchain transaction in other ledgers maintained by each of the one or more other blockchain nodes.

11. The system of claim 8, wherein the proxy agent is installed on the first blockchain node.

12. The system of claim 11, where the proxy agent is within a certain geographical distance between the first blockchain node.

13. The system of claim 8, wherein the proxy agent is configured to:
    transmit updates to the one or more other blockchain nodes to update copies of the other ledgers at the one or more other blockchain nodes.

14. The system of claim 8, wherein the proxy agent is configured to:
    cache the blockchain transaction at the proxy ledger after the blockchain transaction is transmitted to the one or more other blockchain nodes; and
    delete the blockchain transaction from the proxy ledger after the blockchain transaction is sent to the other blockchain nodes, and after a confirmation of receipt of the blockchain transaction from the other blockchain nodes is received.

15. A non-transitory computer readable storage medium configured to store one or more instructions that when executed by a processor cause the processor to perform:
    identifying a blockchain transaction requiring processing at a first blockchain node in a blockchain work including other blockchain nodes;
    executing a smart contract associated with the blockchain transaction by the first blockchain node and by a proxy agent acting on behalf of the other blockchain node, the proxy agent being co-located with the first blockchain node and the proxy agent storing proxy ledger of transactions submitted only to the first blockchain node;
    determining to commit the blockchain transaction; and
    storing the blockchain transaction in a ledger maintained by the first blockchain node.

16. The non-transitory computer readable storage medium of claim 15, wherein the one or more instructions are further to cause the processor to perform:
    receiving an endorsement at the first blockchain node from the proxy agent;
    executing the smart contract node by one or more of the other blockchain nodes in the blockchain network;
    determining to commit the blockchain transaction by the one or more other blockchain nodes; and
    storing the committed blockchain transaction in other ledgers maintained by each of the one or more other blockchain nodes.

17. The non-transitory computer readable storage medium of claim 15, wherein the proxy agent is installed on the first blockchain node.

18. The non-transitory computer readable storage medium of claim 15, wherein the one or more instructions are further to cause the processor to perform:
    transmitting updates from the proxy agent to one or more other blockchain nodes, in the blockchain network, to update copies of the other ledgers at the one or more other blockchain nodes.

19. The non-transitory computer readable storage medium of claim 18, wherein the one or more instructions are further to cause the processor to perform:
    caching the blockchain transaction at the proxy ledger after transmitting the blockchain transaction to the one or more other blockchain nodes; and
    deleting the blockchain transaction from the proxy ledger after transmitting the blockchain transaction to the other blockchain nodes, and after receiving a confirmation of receipt of the blockchain transaction from the other blockchain nodes.

\* \* \* \* \*